J. M.ᶜCormick,

Brewing Ale &c

No. 96,939.    Patented Nov. 16, 1869.

WITNESSES.

INVENTOR
James McCormick

United States Patent Office.

JAMES McCORMICK, OF BOSTON, MASSACHUSETTS.

Letters Patent No. 96,939, dated November 16, 1869.

IMPROVEMENT IN BREWING ALE, BEER, &c.

The Schedule referred to in these Letters Patent and making part of the same.

*To all persons to whom these presents shall come:*

Be it known that I, JAMES McCORMICK, of Boston, in the county of Suffolk, and State of Massachusetts, have invented a new and useful Improvement in the Process of Brewing Malt and other Substances; and that the following, taken in connection with the accompanying plate of drawings, to which reference is hereinafter had, is a full and complete description of the same.

The object of the present invention is to remove from wort, that is, the liquid product or result of malt, subjected to the mashing-operation, so termed, in brewing, those elements contained in it either in a state of solution or suspension, or in both, (such as fine flocks of coagulated albumen, combined with tannin, starch, mucilaginous matter, or gums,) which, in completing the brewing of ale or beer therefrom, as is well known to brewers, will not only occasion delay and hinder the clarification of the mash, but also tend to acidify the same, if exposed to the air, as it must be, necessarily, more or less, before the brew is completed; and for this purpose, The invention consists in subjecting the wort or mash-liquid to the action of such an agent or agents (such as, for instance, charcoal, previously washed or otherwise suitably treated, to prevent its imparting color to the wort, either in combination or not with a screen or screens,) as will remove the aforementioned impurities from the wort or mash-liquid, and produce a thorough purification or clarification of its saccharine qualities.

In the accompanying plate of drawings, one form of apparatus for carrying out my improvement in the process of brewing, is illustrated—

Figure 1:
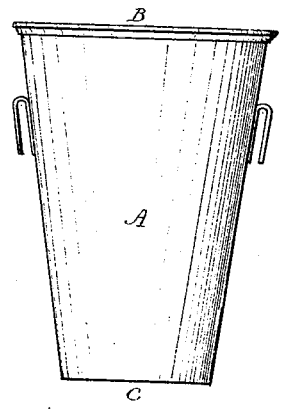
Figure 2:
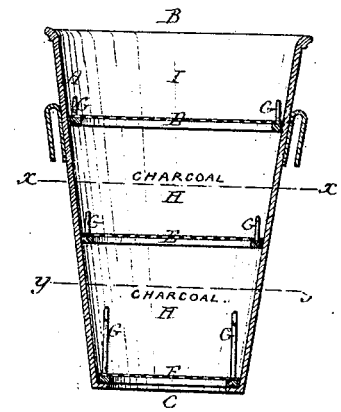

Figure 1 being a side elevation of an apparatus for such purpose;

Figure 2, a central vertical section; and

Figure 3:
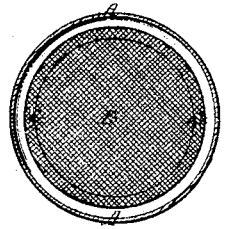
Figure 4:
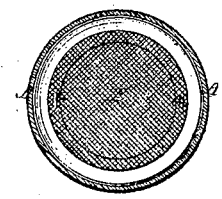

Figures 3 and 4, transverse horizontal sections, taken in the planes of the lines $x\ x$ and $y\ y$, respectively, of fig. 2.

A, in the drawings, represents a vessel or tank, made of conical shape, and open at both ends, its larger end, B, uppermost, which is the end at which the wort or mash-liquid is to enter it, escaping at the lower or smaller end C.

Within the vessel A are located three screens, D, E, and F, each provided with eyes G, for convenience in inserting and removing them, with one screen above another, but made of such a size as to leave a chamber or space, H, between, the smaller one, F, resting at the lower end of the vessel, and the upper one, D, below the upper end or top to the vessel, so as to form a space or chamber, I, for the wort, enabling it to become distributed over the surface of the screen, constituting the bottom of said chamber.

Within the chambers H, between the screens, the clarifying or purifying-agent used is to be placed, charcoal, disintegrated or broken up into small particles, and previously washed, or otherwise suitable prepared, to prevent its imparting color to the wort, being the most preferable.

With an apparatus constructed as above described, the invention embraced herein is enabled to be carried out most perfectly and successfully, the first screen or sieve serving to remove from the wort, in a greater or lesser degree, the flocky elements held in suspension, while the liquid freely passes through the screen to the charcoal within the chamber below, by the action of which the wort is more or less freed from the starch and mucilaginous compounds held by it in solution; when, passing through the next screen, and from thence through the charcoal in the chamber below it, to and through the lower screen, it escapes from the vessel thoroughly cleansed of all impurities, and clarified.

In lieu of arranging the vessel A for a downward passage of the wort through it, it may be located for an upward passage; and in lieu of the peculiar construction and arrangement of it described, it may be made in various forms, and with more or less chambers of the charcoal or clarifying-agent, and with more or less screens or sieves, or with none; but I deem it preferable to use screens in connection with the clarifying-agent, as they assist the passage of the wort through the charcoal, and the action of it thereon, as is obvious.

Although I have particularly specified charcoal as the clarifying-agent employed, its properties for such a purpose being well known, I wish it to be distinctly understood that I do not intend to limit my invention to the use of charcoal nor to the use of any particular clarifying-agent or agents, nor to the use of one alone, or to two or more in combination in the same chamber or vessel, or in different chambers or vessels, the wort passing from one to the other; this invention consisting in subjecting wort or mash-liquor to the action of such an agent or agents as will remove therefrom those elements or particles held in solution, or in a state of suspension, or in both, that, in the completion of the brewing of the wort, would tend to deteriorate it both in color and taste, it being most preferable to so subject the wort while heated, but it may be done when cool.

Having thus described my invention.

What I claim, and desire to have secured to me by Letters Patent, is—

In the process of brewing, subjecting the wort or mash-liquid to charcoal, or its equivalent, either alone or in combination with other materials, and either in combination or not with a screen or screens, substantially as and for the purpose described.

The above specification of my invention signed by me, this 2d day of October, A. D. 1869.

JAS. McCORMICK.

Witnesses:
JAMES BRENNAN,
EDWIN W. BROWN.